(No Model.) 2 Sheets—Sheet 1.
O. B. PECK.
CENTRIFUGAL ORE SEPARATOR.
No. 489,200. Patented Jan. 3, 1893.
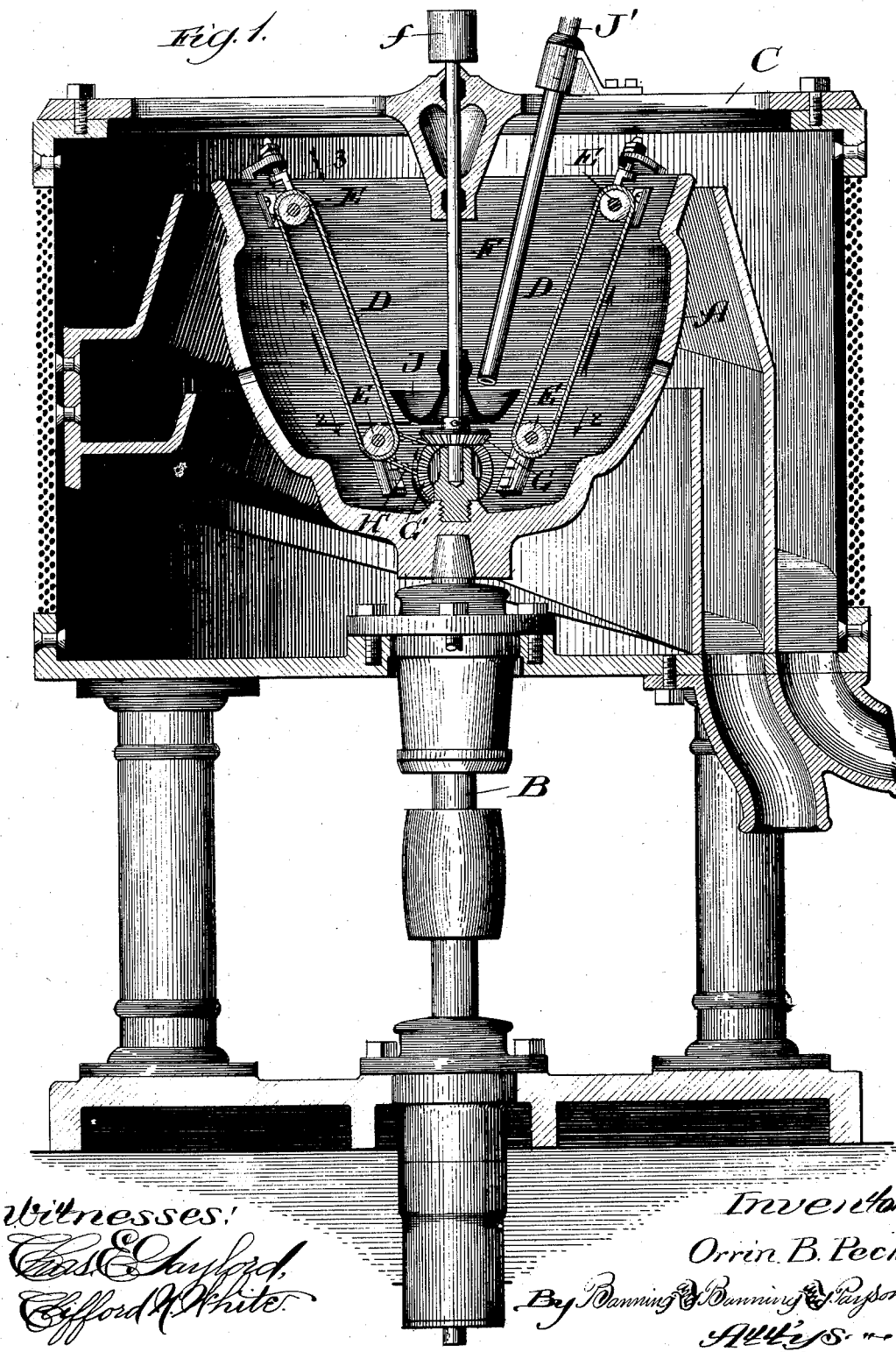
Witnesses:
Chas. E. Gayford
Clifford H. White
Inventor:
Orrin B. Peck.
By Banning & Banning & Payson
Attys.

(No Model.) 2 Sheets—Sheet 2.
O. B. PECK.
CENTRIFUGAL ORE SEPARATOR.
No. 489,200. Patented Jan. 3, 1893.
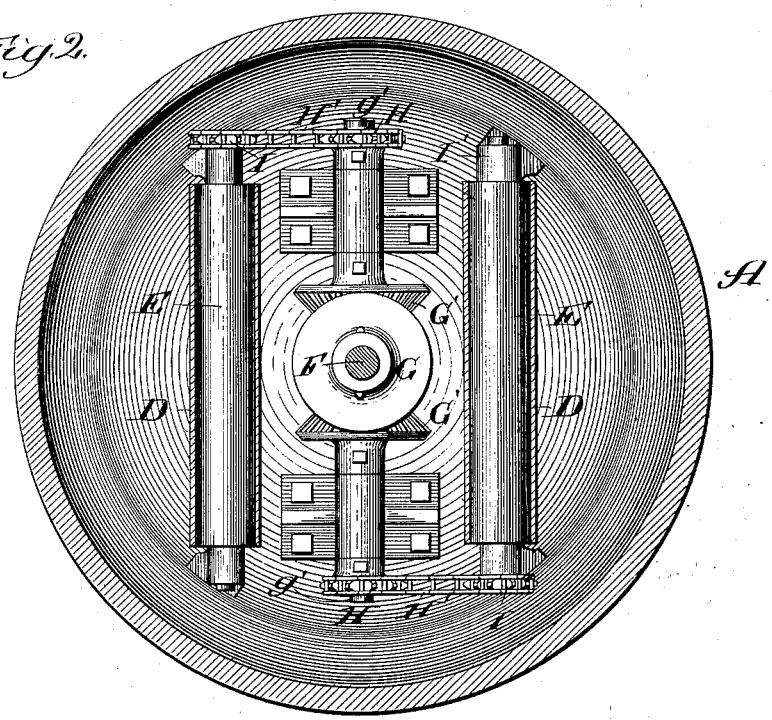
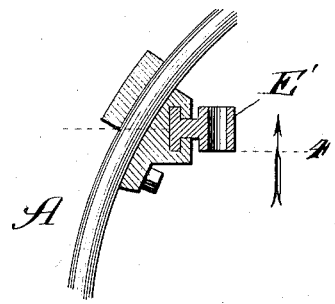
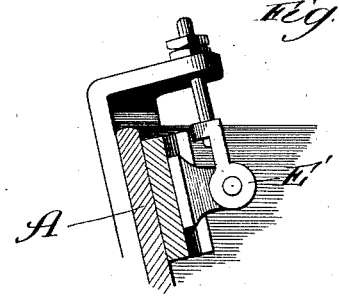
Witnesses:
Chas. E. Gaylord
Clifford N. White
Inventor:
Orrin B. Peck,
By Banning & Banning & Payson,
Att'ys

UNITED STATES PATENT OFFICE.

ORRIN B. PECK, OF CHICAGO, ILLINOIS, ASSIGNOR TO MELINDA PECK, OF SAME PLACE.

CENTRIFUGAL ORE-SEPARATOR.

SPECIFICATION forming part of Letters Patent No. 489,200, dated January 3, 1893.

Application filed April 24, 1891. Serial No. 390,332. (No model.)

*To all whom it may concern:*

Be it known that I, ORRIN B. PECK, a citizen of the United States, residing at Chicago, Cook county, Illinois, have invented certain new and useful Improvements in Centrifugal Ore-Separators, of which the following is a specification.

The object of my improvement is to provide means for more thoroughly and effectually separating the particles of the material being treated, and this I accomplish by constructing a machine which combines the qualities of the various belt separating machines and the centrifugal separating machines; and my invention consists in the features and details of construction hereinafter described and claimed.

In the drawings, Figure 1 is a vertical central section of a machine embodying my improvements; Fig. 2 a cross section in an enlarged scale on line 2 2 of Fig. 1, looking in the direction of the arrows; Fig. 3 a section on line 3 of Fig. 1, looking in the direction of the arrow; and Fig. 4 a section on line 4 of Fig. 3, looking in the direction of the arrow.

In constructing my improved machine, I provide a vessel A, of suitable form and dimensions to receive the parts to be contained therein, as hereinafter described. I mount this vessel upon a shaft B, by means whereof it is supported and revolved, and I preferably inclose it by a curb C, or other suitable device.

Within the vessel I place one or more belts D, supported upon traveling rollers E, preferably supported in journals E', secured to the vessel. One of these rollers is preferably made movable for the purpose of adjusting the tension of the belt, as shown in the drawings, more particularly in Figs. 1, 3 and 4.

For the purpose of driving the rollers to cause the belt D, to travel, I provide a properly journaled shaft F, carrying a suitable belt pulley *f*, and upon this shaft I mount a beveled gear G. This beveled gear meshes, as shown, with beveled gears G', mounted upon suitably journaled shafts *g'*. On these shafts I mount sprocket wheels H, over which pass sprocket chains H', which also travel over sprocket wheels I, mounted upon the rollers over which the belt travels. By this means, as the shaft F, is revolved by any suitable power, the rollers will be driven and the belts caused to travel over them. I preferably secure to the shaft a suitable receptacle J, into which the water and material to be treated are introduced by means of a pipe, as J'.

In operating the machine, I revolve the vessel A, together with the parts contained therein, and at the same time impart a revolution to the shaft F, in the same direction with the vessel, but at a rate of speed varying slightly from that of the vessel, in order to secure a slow travel of the belts D. The belts travel in the direction indicated by the arrows, and as the water and material are received into the receptacle J, they are discharged upward and outward therefrom by centrifugal force and deposited upon the surface of the belts, over which they pass. As the water and materials pass over the surface of the belts, the heavier particles are caused, by the action of centrifugal force, to adhere to such surfaces, and are carried down and around by the travel of the belts, until they reach a point where the action of the centrifugal force upon the particles tends to remove them from the surface of the belts. It will thus be seen that the rotatable vessel A serves mainly as a frame work, to contain and support the separating belts and as a means of carrying them around the axis of rotation. I desire to be understood, therefore, that in speaking in the specification and claims of a revoluble vessel I mean something, capable of receiving and supporting the separating belts and carrying them around a common center of rotation.

As above described and as shown in the drawings, the belts D in the vessel A travel around their rollers, while they are at the same time carried around by the rotation of the vessel in which their rollers are arranged. I consider that the employment of belts which travel while being rotated or carried around in a circle as the gist of my invention, and I do not desire therefore to limit myself to specific forms of construction, so long as this idea is employed.

I claim:

1. In centrifugal ore-separators, the combination of a revoluble vessel, and one or more traveling belts inside the vessel and revolving therewith, substantially as described.

2. In centrifugal ore-separators, the combination of a revoluble vessel, one or more belts inside the vessel simultaneously traveling in one plane and revolving in another, and means for imparting said motions to the vessel and belts, substantially as described.

ORRIN B. PECK.

Witnesses:
 THOMAS A. BANNING,
 SAMUEL E. HIBBEN.